Feb. 4, 1930.                B. E. CHEELY                1,746,103
                               DUMP CAR
                   Original Filed June 30, 1928   2 Sheets-Sheet 1
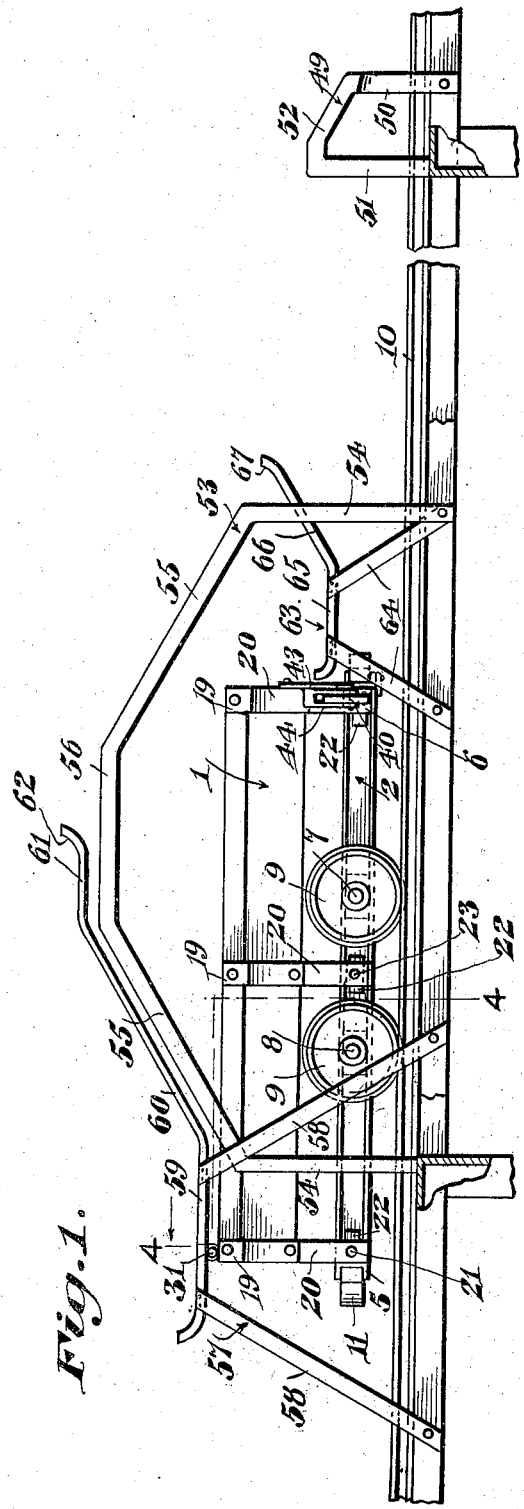
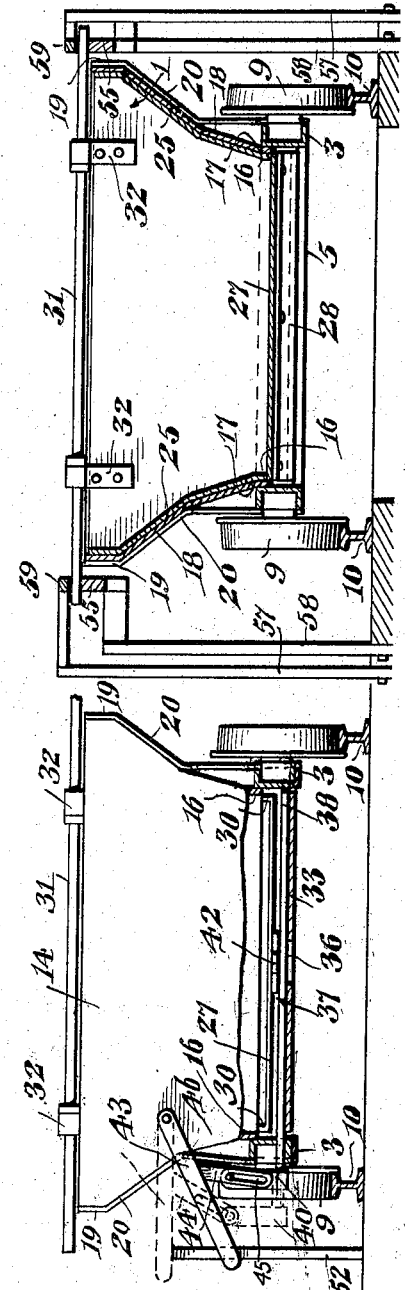
INVENTOR
Beulah E. Cheely,
BY Geo. P. Kimmel.
ATTORNEY.

Feb. 4, 1930. B. E. CHEELY 1,746,103
DUMP CAR
Original Filed June 30. 1928 2 Sheets-Sheet 2
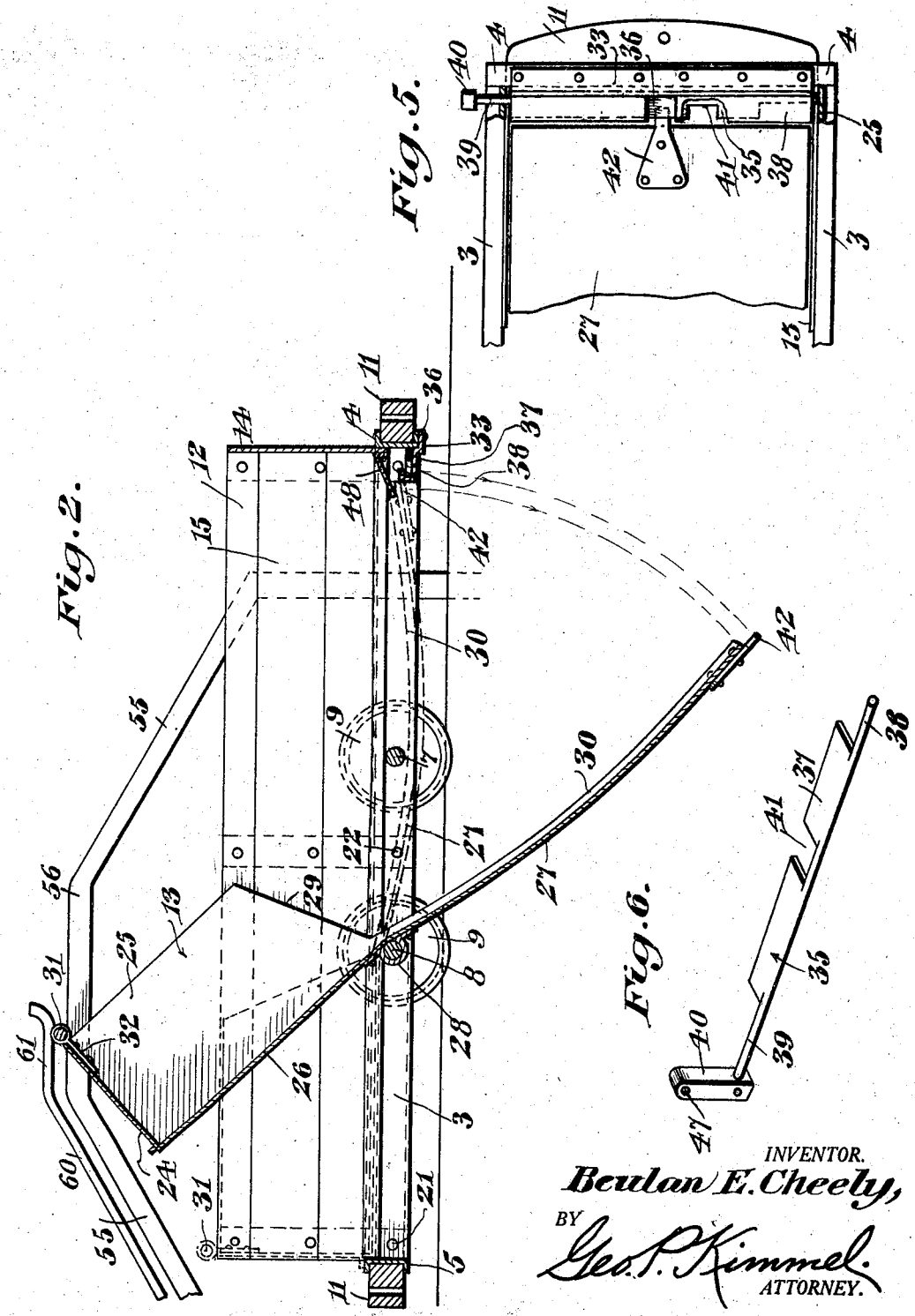
INVENTOR.
Beulan E. Cheely,
BY
Geo. P. Kimmel.
ATTORNEY.

Patented Feb. 4, 1930

1,746,103

UNITED STATES PATENT OFFICE

BEULAN E. CHEELY, OF FORK MOUNTAIN, TENNESSEE

DUMP CAR

Application filed June 30, 1928, Serial No. 289,522. Renewed December 16, 1929.

This invention relates to a dump car and has for its primary object to provide in a manner as hereinafter set forth, a car particularly adapted for use in mines, and which may be automatically unloaded at the point of discharge with the car remaining in motion.

A further object of the invention is to provide a dump car as aforesaid constructed in a manner whereby the normal capacity of a car of such type is increased without increasing the normal height thereof.

A further object of the invention is to provide a dump car as aforesaid, the body of which is formed with a pair of one-piece sections, one of which is tiltably mounted on one of the car axles to provide for the discharge of a load with the other section remaining stationary.

Other objects and advantages will be apparent during the course of the following description.

In the accompanying drawings in which like numerals are employed to designate like parts throughout the same, Figure 1 is a side elevation of a dump car constructed in accordance with this invention, and showing the controlling apparatus therefor, Figure 2 is a longitudinal section of the car, showing the same in unloading position, Figure 3 is an end elevation of the car, Figure 4 is a section taken on line 4—4 of Figure 1, Figure 5 is a fragmentary bottom plan of the car, Figure 6 is a detail perspective view of a sliding latch member carried thereby.

In the drawings wherein for the purpose of illustration is shown an embodiment of my invention, the numeral 1 designates generally the body portion of my improved car and 2 designates generally the frame thereof. The frame 2 consists of a pair of side members 3, a front cross member 4, and a rear cross member 5. The members 3, 4 and 5 are of channel construction and disposed with the channels thereof positioned outwardly. The inner ends of the cross members 4 and 5 abut against the inner faces of the side members 3, and the several frame members are secured together by means of a right angular strap 6 positioned at each corner of the frames. The straps 6 are substantially of the same thickness as the depth of the channels in the frame members, and each of the straps 6 is positioned with one portion thereof extending longitudinally of one of the frame members 3 and with the other portion thereof extending longitudinally of one of the cross members 4 and 5. The straps 6 are disposed along the outer faces of the frame members and lie within the channels of said members.

Carried by the frame 2 is a pair of axles 7 and 8 respectively, which are disposed transversely of the car between the transverse median and the ends thereof and extend through the side members 3, said axles being fixedly secured to said side members. Rotatably mounted on each of the axles is a pair of flanged wheels 9 of the usual type, by means of which the car may be mounted on a track 10. A coupling member 11 is secured to each of the cross members 4 and 5, by means of which two or more cars may be connected together.

The body portion 1 of the car consists of an outer section 12 and an inner section 13. The outer section 12 consists of a forward end wall 14 and a pair of side walls 15 which extend for the entire length of the car. The walls 14 and 15 are respectively seated on the cross member 4 and the side members 3. Each of the side walls 15 is formed with a relatively short vertical portion 16 which lies flat against the inner face of one of the side frame members 3. Adjacent the upper surface of the frame members 3, the side walls 15 are offset outwardly at a slight angle as at 17, then further offset at an outward angle to form the portions 18, and terminate at their upper extremities in relatively short, vertically extending portions 19. The portions 19 project outwardly from the vertical plane of the wheels 9. The portions 18 are supported by a plurality of braces 20, the upper portions of which lie flat against the outer surfaces of the portions 18 and are secured thereto, and the lower portions of which extend vertically and lie flat against the outer faces of the frame members 3. In the embodiment shown, there are three brace members 20 for each of the side walls 15, one of which is disposed adjacent each end of said side wall and one centrally thereof. The braces which are disposed adjacent the ends of the side walls 15 are secured to the side members 3 of the frame by means of suitable bolts 21, each of which extends through one of the braces 20, straps 6 and frame members 3.

A block 22 is provided in the channel of the frame member 3 at its point of connection with the centrally disposed brace 20. A suitable bolt 23 extends through the centrally disposed brace 20, block 22, and frame 3, for securing said brace in position.

The inner section 13 of the body portion consists of a rearward end wall 24, a pair of side walls 25, and a bottom having a flat portion 26 and a curved portion 27. At the point of merger between the portions 26 and 27, the bottom is tiltably mounted on the axle 8, by means of a bracket 28 which extends transversely of the bottom for substantially the entire width thereof. The bracket 28 is secured to the lower face of the bottom and is formed with a central portion of substantially semi-circular shape in cross section, through which central portion the axle 8 loosely extends. The side walls 25 of the inner section 13 are disposed at their outer faces against the inner faces of the side walls 15 of the outer section 12 and are formed with portions corresponding to the portions 16, 17, 18 and 19 of the walls 15. The forward ends 29 of the side walls 25 incline upwardly and rearwardly, and the lower portions of said forward ends 29 terminate adjacent the point of merger between the flat portion 26 and curved portion 27 of the bottom. At the lower extremities of the ends 29, the side walls 25 are formed with extensions 30, which are formed with the same curvature as the curved portions 27 of the bottom and provide upstanding flanges for said curved portions.

The inner section 13 provides a closure for the open bottom and open rearward end of the outer section 12.

Secured at the upper edge of the end wall 24 is a cross bar 31, the ends of which project laterally beyond the side edges of the end walls 24, and the purpose of which will be hereinafter disclosed. The cross bar 31 is secured in position by suitable clamps 32.

Secured to the lower face of the cross members 4 is a guide 33, which projects rearwardly beyond the rear face of said cross member. The extending portion is U-shaped in cross-section to provide a guide-way for a sliding latch member indicated generally at 35. Centrally thereof, the extended portion of the guide 33 is formed with a notch 36. The latch member 35 consists of a flat central portion 37 and terminal portions 38 and 39 respectively, which are circular in cross section. The terminal portion 39 extends through one of the frame members 3, and is provided on the end thereof with a lug 40, the inner face of which abuts against the outer face of the frame member 3 with the extreme end of the terminal portion 38 abutting against the inner face of the opposite frame member 3. The central portion 37 of the latch member 35 is formed with a notch 41 corresponding to the notch 36 in the extended portion of the guide 33. When the latch member 35 is disposed with the lug 40 in abutment with the outer face of the frame member 3, the notches 41 and 36 are out of registry. A tongue 42 projects forwardly from the forward end of the curved portion 27 of the bottom, and is adapted to pass through the notch 36 when the inner section 13 is tilted to closed position.

Pivoted to the outer face of the forward wall 14 is a lever 43, which is formed with an angularly extending arm 44, provided with a longitudinally extending slot 45. The arm 44 is secured to the lug 40 by means of a suitable bolt 46 which extends through the slot 45 and through a bore 47 in the lug 40. When the lever 43 is moved to its downward limit, the bolt 46 is disposed at the upper end of the slot 45, and when the lever 43 is moved upwardly, the walls of the slot 45 are moved along the bolt 46 to exert an outward pressure on the lug 40, thereby sliding the latch member 35 and bringing the notch 41 into registry with the notch 36. With the latch member 35 in this position, the tongue 42 may be passed upwardly through both notches 41 and 36. When the lever 43 is actuated downwardly, the latch member 35 is actuated to bring the notch 41 out of registry with the notch 36, in which position the tongue 42 is supported on the upper face of the central portion 37 of the latch member 35. With the sections 12 and 13 in closed position, the forward end of the curved portion 27 of the bottom projects forwardly beyond a rearwardly, angularly offset portion 48 formed on the lower end of the forward wall 14. With the sections 12 and 13 in closed position, the lowermost extremity of the curved bottom portion 27 is disposed beneath the horizontal plane of the lower edges of the frame members 3, the space between such bottom portion and the frame 3 being closed by the flanges 30.

Suitably disposed at one side of the track 10 is a relatively short standard 49, which consists of a pair of upright members 50 and 51 respectively, connected at their upper ends by means of an inclined member 52. Spaced from the standard 49 is a relatively high standard 53, which consists of a pair of spaced upright members 54, respectively merging into a pair of converging, inclined members 55, and a horizontal member 56 connecting the inclined members 55.

Adjacent the standard 53, a coacting standard 57 is provided, which consists of a pair of supports 58 connected by a horizontal member 59. The horizontal member 59 is formed with an angularly disposed arm 60 which is spaced above and extends in parallel relation with the rearward inclined member 55 of the standard 53. The arm 60 merges into a horizontal portion 61 which is spaced above the horizontal member 56, and terminates in an arcuate end portion 62, which is located in the plane of the vertical median of the standard 53. Coacting with the standard 49 is a standard 63 which consists of a pair of supports 64 connected together by means of a horizontal member 65. The member 65 is provided with an angularly extending arm 66 which terminates in an arcuate end portion 67. The end portion 67 projects above the horizontal plane of the upper end of the upright member 51 of the standard 49.

When one of my improved cars reaches a discharge point wherein the standards 49, 53, 57 and 63 are located, the projecting end of the lever 43 strikes the inclined surface 52 of the standard 49 which actuates the lever 43 upwardly to slide the latch member 35 within its guide-way. When the notch 41 is brought into registry with the tongue 42 and notch 36, the tongue 42 is free to move downwardly through said notches. At the same time that the tongue 42 is released, the cross bar 31 on the upper edge of the rear wall 24 of the section 13 strikes the forwardly disposed inclined member 55 of the standard 53, causing the inner section 13 to be tilted to the position shown in Figure 2. When the cross bar 31 comes in contact with the horizontal portion 61 of the standard 57 further tilting of the section 13 is prevented, and upon contact of the cross bar 31 with the rearwardly disposed inclined member 55 the section 13 is re-tilted to closed position.

At the same time that the section 13 is tilted to closed position, the arm 43 is brought into contact with the lower surface of the arm 66 of the standard 63 and the latch member 35 is thereby actuated to move the notch 41 out of registry with the tongue 42 and notch 36, whereby the tongue 42 is again supported by the central portion 37 of the latch member 35.

It is to be understood that the form of the invention herewith shown and described is to be taken as a preferred example of the same and that various changes in the size, shape and arrangement of parts may be resorted to without departing from the spirit of the invention or the scope of the appended claims.

What I claim is:

1. In a dump car including a pair of axles, a body portion formed with a one-piece outer section and a one-piece inner section, said outer section providing an end wall and a pair of side walls for said car, said inner section providing an end wall and a bottom for said car and being mounted for bodily tiltable movement on one of said axles, said bottom having a curved portion disposed beneath the other of said axles.

2. In a dump car including a pair of axles, a body portion formed with a one-piece outer section and a one-piece inner section, said outer section providing an end wall and a pair of side walls for said car, said inner section providing an end wall and a bottom for said car and being mounted for bodily tiltable movement on one of said axles and having a pair of side walls normally opposing and of less length than the side walls of said outer section, said bottom having a flat portion coextensive with said inner section side walls and merging into a curved portion extending beneath the other of said axles.

3. In a dump car including a pair of axles, a body portion formed with a one-piece outer section and a one-piece inner section, said outer section providing an end wall and a pair of side walls for said car, said inner section providing an end wall and a bottom for said car and being mounted for bodily tiltable movement on one of said axles and having a pair of side walls normally opposing and of less length than the side walls of said outer section, said bottom having a flat portion coextensive with said inner section side walls and merging into a curved portion extending beneath the other of said axles, said curved portion being formed at its longitudinal edges with upstanding flanges.

4. In a dump car including a frame and a pair of axles carried thereby, a body portion formed with an outer section and an inner section, said outer section providing an end wall and a pair of side walls for said car, said inner section providing an end wall and a bottom for said car and being mounted for bodily tiltable movement on one of said axles, said bottom extending beneath the other of said axles and provided with a tongue projecting from the forward end thereof.

5. In a dump car including a frame and a pair of axles carried thereby, a body portion formed with an outer section and an inner section, said outer section providing an end wall and a pair of side walls for said car, said inner section providing an end wall and a bottom for said car and being mounted for bodily tiltable movement on one of said axles, said bottom extending beneath the other of said axles and provided with a tongue projecting from the forward end thereof, and means carried by said frame and coacting with said tongue for latching said inner section in closed position.

6. In a dump car including a frame and a pair of axles carried thereby, a body portion formed with an outer section and an inner section, said outer section providing an end wall and a pair of side walls for said car, said inner section providing an end wall and a bottom for said car and being mounted for bodily tiltable movement on one of said axles, said bottom extending beneath the other of said axles and provided with a tongue projecting from the forward end thereof, and means carried by said frame and coacting with said tongue for latching said inner section in closed position, said means including a guide formed with a notch and a latch member slidable within the guide and formed with a notch normally out of registry with said guide notch.

7. In combination, a dump car comprising a frame, a body portion formed with an outer and an inner section, said inner section providing an end and bottom for said car and being mounted for bodily tiltable movement, means for latching said inner section against tilting movement, and means for actuating said latching means to permit tilting movement to said inner section, said latching means including a tongue formed on said bottom, and a slidable latch member carried by said frame and formed with a notch for the reception therethrough of said tongue.

8. In combination, a dump car comprising a frame, a body portion formed with an outer and an inner section, said inner section providing an end and bottom for said car and being mounted for bodily tiltable movement, means for latching said inner section against tilting movement, and means for actuating said latching means to permit tilting movement to said inner section, said latching means including a tongue formed on said bottom, and a slidable latch member carried by said frame and formed with a notch for the reception therethrough of said tongue, said latching means including a slidable member for supporting said bottom, said actuating means including a lever carried by the car and projecting therefrom for moving said slidable member.

9. A dump car comprising a frame, an outer section fixedly mounted thereon, an inner section tiltably mounted thereon, and means for latching said inner section against tilting movement, said means including a latch member formed with a notch and mounted for sliding movement transversely of the frame, one end of said latch member projecting from the frame and formed with a lug, a lever pivoted to the car and having an angularly disposed arm formed with a longitudinally extending slot, means extending through said slot for loosely securing said arm to said lug, and a tongue carried by said tiltable section for engagement with said latch member.

10. A dump car comprising a frame, a pair of spaced axles extending transversely therethrough and positioned between the transverse median of the frame and one end thereof, a body portion carried by the frame and including a stationary outer section formed with an open end and bottom, said body portion further including a tiltable inner section providing a closure means for said open end and bottom, said tiltable section being substantially of the same length as the stationary section, said bottom closing means being pivotally mounted on one of said axles and having a curved portion disposed beneath the other of said axles.

11. A dump car comprising a frame, a pair of spaced axles extending transversely therethrough and positioned between the transverse median of the frame and one end thereof, a body portion carried by the frame and including a stationary outer section formed with an open end and bottom, said body portion further including a tiltable inner section providing a closure means for said open end and bottom, said tiltable section being substantially of the same length as the stationary section, said bottom closing means being pivotally mounted on one of said axles and having a curved portion disposed beneath the other of said axles and depending below the horizontal plane of said frame, said curved portion being formed at its longitudinal edges with upstanding flanges.

In testimony whereof, I affix my signature hereto.

BEULAN E. CHEELY.